(12) United States Patent
Belov et al.

(10) Patent No.: US 11,535,560 B2
(45) Date of Patent: Dec. 27, 2022

(54) CHROMATE-FREE CERAMIC COATING COMPOSITIONS FOR HOT CORROSION PROTECTION OF SUPERALLOY SUBSTRATES

(71) Applicant: PRAXAIR S.T. TECHNOLOGY, INC., North Haven, CT (US)

(72) Inventors: Irina Belov, Zionsville, IN (US); Zhihong Tang, Carmel, IN (US); Brian Fitzwater, Indianapolis, IN (US); Daryl G Copeland, Greenwood, IN (US)

(73) Assignee: Praxair S.T. Technology, Inc., North Haven, CT (US)

( * ) Notice: Subject to any disclaimer, the term of this patent is extended or adjusted under 35 U.S.C. 154(b) by 621 days.

(21) Appl. No.: 16/406,292

(22) Filed: May 8, 2019

(65) Prior Publication Data

US 2020/0354276 A1 Nov. 12, 2020

(51) Int. Cl.

| | |
|---|---|
| *C04B 28/34* | (2006.01) |
| *B05D 7/14* | (2006.01) |
| *B05D 7/00* | (2006.01) |
| *C04B 14/30* | (2006.01) |
| *C04B 103/00* | (2006.01) |
| *C04B 103/61* | (2006.01) |
| *C04B 111/00* | (2006.01) |

(52) U.S. Cl.
CPC .............. *C04B 28/342* (2013.01); *B05D 7/14* (2013.01); *B05D 7/546* (2013.01); *C04B 14/303* (2013.01); *C04B 14/307* (2013.01); *B05D 2202/00* (2013.01); *B05D 2301/10* (2013.01); *B05D 2401/20* (2013.01); *C04B 2103/0018* (2013.01); *C04B 2103/61* (2013.01); *C04B 2111/00525* (2013.01)

(58) Field of Classification Search
CPC . C09D 1/00; C09D 5/08; C09D 5/084; C09D 7/61; C09D 7/69; C04B 14/303; C04B 14/305; C04B 14/307; C04B 20/008; C04B 28/34; C04B 28/342; C04B 2103/61; C04B 2103/0018; C04B 2111/00525; C04B 2111/1075; C08K 3/22; C08K 2003/2227; C08K 2003/2241; C08K 2003/2251; C23C 24/082; C23C 28/04; B05D 7/14; B05D 7/546; B05D 2202/00; B05D 2301/10; B05D 2401/20
See application file for complete search history.

(56) References Cited

U.S. PATENT DOCUMENTS

| | | |
|---|---|---|
| 3,248,251 A | 4/1966 | Allen |
| 4,537,632 A | 8/1985 | Mosser |
| 4,544,408 A | 10/1985 | Mosser et al. |
| 4,606,967 A | 8/1986 | Mosser |
| 6,444,332 B1 | 9/2002 | Bettridge |
| 7,314,674 B2 | 1/2008 | Hazel et al. |
| 7,604,867 B2 | 10/2009 | Hazel et al. |
| 7,754,342 B2 | 7/2010 | Hazel et al. |
| 7,955,694 B2 | 6/2011 | Hazel et al. |
| 8,596,985 B2 | 12/2013 | Walker et al. |
| 9,017,464 B2 | 4/2015 | Belov |
| 9,394,448 B2 | 7/2016 | Belov et al. |
| 9,598,775 B2 | 3/2017 | Belov |
| 9,777,583 B2 | 10/2017 | Leggett |
| 2016/0083588 A1 | 3/2016 | Schlchtel et al. |
| 2017/0204275 A1 | 7/2017 | Pedoni et al. |

FOREIGN PATENT DOCUMENTS

| | | |
|---|---|---|
| EP | 1801083 A1 | 6/2007 |
| WO | 8505352 A1 | 12/1985 |
| WO | 2016/148967 A1 | 9/2016 |

OTHER PUBLICATIONS

Pollock et. al.; Nickel-based Superalloys for Advanced Turbine Engines: Chemistry, Microstructure and Properties, Journal of Propulsion and Power; vol. 22, No. 2, Mar.-Apr. 2006; pp. 361-374.
B. G. McMordie; Impact of Smooth Coatings on the Efficiency of Modern Turbomachinery, Aerospace / Airline Plating & Metal Finishing Forum; Cincinnati, Ohio, Mar. 27-29, 2000, Sermatech International Inc.; pp. 1-7.
M. Vippola et al.; Thermal analysis of plasma sprayed oxide coatings sealed with aluminum phosphate; Journal of the European Ceramic Society; 22 (2002) pp. 1937-1946; 2002 Elsevier Science Ltd. P11:S0955-2219(01)00522-2.
S.Y. Jeong et al.; Chemically Bonded Phosphate Ceramics: Cementing the Gap Between Ceramics and Cements; Technology Reviews and Studies, Engineering Technology Division, Chemical Technology Division, Argonne National Library, Argonne, IL; Jun. 2002; pp. 1-18(tables 1-5).

*Primary Examiner* — Anthony J Green
(74) *Attorney, Agent, or Firm* — Nilay S. Dalal

(57) ABSTRACT

Hexavalent chromium-free slurry formulations which are suitable in the production of ceramic overlay coating systems are described. The formulations provide superior hot corrosion and heat oxidation protection for superalloy substrates. A basecoat slurry and topcoat slurry are provided. The basecoat slurry includes an aluminum phosphate based aqueous solution having a molar ratio of $Al:PO_4$ higher than about 1:3 with the incorporation of metal oxide particles. The topcoat slurry includes an aluminum phosphate based aqueous solution having a molar ratio of $Al:PO_4$ higher than about 1:3. Both of the basecoat slurry and the topcoat slurry are hexavalent chromium-free.

19 Claims, 6 Drawing Sheets
(6 of 6 Drawing Sheet(s) Filed in Color)

Fig. 1a: after 140 cycles

Fig. 1b: after 260 cycles

Fig. 1c: after 400 cycles

Fig. 2a: optical microscopy (x40)

Fig. 2b: SEM (x500)

Fig. 6a Test with Mixture A: after 100 cycles

Fig 6b Test with Mixture B: after 500 cycles

Bare substrate exposed

*Fig. 10a As-prepared*

*Fig. 10b Sample E*

*Fig. 10c Sample F*

*Fig. 12 a As-prepared*

*Fig. 12b after 100 cycles*

*Fig. 12c after 500 cycles*

Bare substrate exposed

CHROMATE-FREE CERAMIC COATING COMPOSITIONS FOR HOT CORROSION PROTECTION OF SUPERALLOY SUBSTRATES

FIELD OF THE INVENTION

The present invention relates to novel hexavalent chromium-free slurry formulations which are suitable in the production of ceramic overlay coating systems providing superior hot corrosion and heat oxidation protection for superalloy substrates and capable of replacing traditional hexavalent chromium (Cr(VI))-containing slurries and coatings. The slurry formulations and coatings are particularly suitable for use on turbine engine components.

BACKGROUND OF THE INVENTION

The surfaces of turbine engine components are exposed to hot gases from the turbine combustion process. Turbine engine superalloy materials are selected based on their high temperature stability and corrosion resistance. Typically, gas turbine engine components are composed of nickel-based superalloys with generally acceptable high temperature mechanical properties, such as fatigue resistance, as well as generally acceptable resistance to oxidation and corrosion damage. Today, various superalloys are commercially available, such as Inconel®718, Inconel®722, Udimet®720, Rene®65 and Rene®88. These superalloys along with others have been extensively studied and discussed in the literature. As an example, typical compositions and advances in nickel-based superalloys used for turbine discs have been reviewed and discussed by Pollock. et. al. in "Nickel-based Superalloys for Advanced Turbine Engines: Chemistry, Microstructure and Properties", J. Propulsion and Power, v. 22, 2, 2006. However, many of today's nickel-based superalloy materials are susceptible to degradation under severe conditions at high operating temperatures. Additionally, newer generation disc superalloys contain lower concentrations of chromium, thus being less resistant to so-called hot corrosion (i.e., sulfidation-caused) attack.

"Hot corrosion" as used herein and throughout is defined as the attack of molten or fused sulfate salts directly on metallic components, specifically on nickel-based alloys. Hot corrosion has been identified and combated in the turbine engines for many years. There are two primary types of hot corrosion. The first type of hot corrosion is so-called high-temperature Type 1 hot corrosion, which is normally observed in the temperature range of about 825-950° C., and most aggressively occurs at about 885° C. (1650° F.). The second type of hot corrosion is low-temperature Type 2 hot corrosion, which is most aggressive around 700° C. (1300° F.). The temperature of the last stages of a compressor can reach and exceed 1300° F. Components including but not limited to nickel-based alloy blades, vanes, disks and seals that operate at 1300° F. or higher in the last stages of a compressor are susceptible to pitting damage from low-temperature Type 2 hot corrosion caused by sulfates accumulating on the surface of such components. The varying mixtures of alkali and alkaline earth sulfates (e.g., sodium, magnesium, potassium and calcium) can be ingested with the inlet air in marine environments or form as a result of a combustion process.

Oxidation and corrosion reactions at the surface of the components can cause metal wastage and loss of wall thickness. The loss of metal rapidly increases the stresses on the respective components and can ultimately result in component failure. Protective coatings are thus applied to the components to protect them from degradation by oxidation and sulfidation corrosion.

The coatings used to protect superalloys are generally divided into diffusion and overlay coating groups. The aluminides are an example of diffusion coatings. The aluminides are based on the enrichment of the surface of the alloy, such as a nickel-based alloy, with aluminum to form an intermetallic compound, such as nickel aluminide. In general, the oxidation and hot corrosion resistance of the coatings are dependent upon the chemistry of the underlying alloy.

Also, hot corrosion attack on superalloy components can be controlled by a so-called "chromizing process", in which diffused chromium layers are produced on the surface of the components. Processes have been developed to modify intermetallic compounds created by diffusion by the addition of precious metals such as Pt, Pd and/or Rh. The modified intermetallic coatings are more expensive by virtue of incorporating precious metals, but often exhibit improved resistance to sulfidation corrosion. For example, U.S. Pat. No. 9,777,583 to Leggett discloses a protective coating applied on a shank and a root of a gas turbine blade; the protective coating comprises platinum and chromium creating a chromium-rich outer oxide scale on top of the coating, thus minimizing a diffusion path for sulfur attack on the base material.

Although often efficient in protecting against Type 2 hot corrosion attack, all types of diffusion derived coatings have a common disadvantage of high processing temperatures required for the diffusion process to take place and to form desirable intermetallic phases in the surface layer of the base material. Specifically, heat treatment may involve a temperature within the range of 850° C. to 1150° C. (1560° F.-2100° F.). As an additional shortcoming, formation of diffusion derived coatings may require a controlled atmosphere, such as argon or vacuum processing.

Another option for the protection of superalloys is overlay coatings. Commercially employed ceramic overlay coatings usually can be formed by curing at 315° C.-340° C. (600° F.-650° F.) in air, thus making processing much easier and less costly in comparison to application of diffusion coatings.

Various multilayer overlay systems have been suggested and used to protect turbine engine components. However, assessment of the commercially available overlay systems has revealed general deficiencies in their compositions and functional properties, as well as several possible failure modes.

For example, a commercially available multilayer overlay system (known as SermaFlow® N3000) provides a generally acceptable smooth, antifouling surface, thus preventing deposits of corrodants. The SermaFlow® N3000 system comprises a chromate-phosphate binder filled with metal oxide pigments (in particular, aluminum oxide $Al_2O_3$ and chromium oxide $Cr_2O_3$) and provides efficient protection against Type 2 hot corrosion caused by a less aggressive corrosive mixture of calcium sulfate and carbon black, as discussed by B. G. McMordie in "Impact of Smooth Coatings on the Efficiency of Modern Turbomachinery", Aerospace/Airline Plating & Metal Finishing Forum, Cincinnati, Ohio, Mar. 27-29, 2000 However, the SermaFlow® N3000 system has been designed for lower service temperatures and is therefore prone to cracking and delamination at elevated operating temperatures (≥~1300° F.) which can be encountered at the last compressor stages in newer engines.

This shortcoming of the SermaFlow® N3000 coating system was overcome by the multilayer overlay system described and patented in U.S. Pat. No. 9,598,775 to Belov. The patented multilayer overlay system exhibits improved corrosion and thermal stability at temperatures of up to 1400° F. when subject to exposure to the same corrosive mixture of calcium sulfate and carbon black. However, as will be shown below in the detailed description and comparative examples of the present invention, the multilayer system of U.S. Pat. No. 9,598,775 fails to provide adequate protection from a more aggressive molten alkali and alkaline earth sulfate corrosive mixture.

Another composition of overlay coating systems recognized for protection of turbine components against Type 2 hot corrosion attack is described in several U.S. patents to Hazel et. al., such as in U.S. Pat. Nos. 7,314,674 and 7,754,342 ("the Hazel Patents"), wherein corrosion resistant coating compositions comprise a glass-forming binder component and a particulate corrosion-resistant component. The glass-forming binder component forms a phosphate-containing or silica-based matrix. The particulate corrosion-resistant component comprises aluminum oxide (i.e. alumina) particles and non-alumina metal alloy particles (such as MCrAlY alloy particles, where M is a nickel or nickel-cobalt alloy). According to Hazel et. al., the non-alumina particulate has a coefficient of thermal expansion (CTE) greater than that of alumina, and can comprise from 5 to 100% of the total particulate content in the coating composition. The role of the non-alumina metal alloy particulate in these coating compositions of the Hazel's Patents is to mitigate CTE mismatch between the coating and the underlying metal substrate because the CTE mismatch makes the coating prone to spallation when subject to thermal cycling and cyclic mechanical strain at elevated temperatures of about 1200 degrees F. or higher.

The functional performance of the ceramic overlay systems for Type 2 hot corrosion protection can be further enhanced when they are employed not as stand-alone protective layers, but in combination with diffusion bond coatings for increasing durability of the protective systems and providing additional resistance to oxidation and sulfidation of the base material. For example, U.S. Pat. No. 8,596,985 to Walker et. al. describes a method of protecting a turbine component from the effect of hot corrosion by applying a chromium diffusion coating in combination with an overlay coating of ceramic material, whereas the ceramic coating comprises a chromate-phosphate binder matrix filled with metal oxide particles, such as particles of aluminum oxide $Al_2O_3$, titanium oxide $TiO_2$ or chromium oxide $Cr_2O_3$.

An overarching concern related to commercially employed overlay systems for hot corrosion protection, such as SermaFlow® N3000, the overlay systems disclosed in the U.S. Pat. Nos. 9,598,775; 8,596,985; 7,314,674; etc., is the presence of hexavalent chromium (Cr(VI)) in the chromate-phosphate binder of these ceramic layers.

Ceramic coating compositions based on chromate-phosphate binders compositions have been well known and considered for decades as the industry standard for forming coatings which are highly corrosion-resistant and heat-resistant. For example, U.S. Pat. No. 3,248,251 to Allen over forty years ago recognized and described the ability of aluminum-ceramic chromium (VI)—containing coatings to exhibit resistance to corrosion, heat and abrasion while retaining adhesion and flexibility. Additionally, U.S. Pat. Nos. 4,537,632; 4,606,967; and 4,544,408 to Mosser et al. describe corrosion resistant coating compositions comprising chromate-phosphate binder systems filled with aluminum metal or aluminum oxide pigments. Today, these aluminum-ceramic coatings are relied upon by original equipment manufacturers (OEM's) in the aircraft and power generation industries for protection of various engine components subject to high temperature and corrosive environments.

Notwithstanding the wide spread utility of the abovementioned ceramic coatings, hexavalent chromium Cr(VI) has been identified as an environmentally hazardous material of concern. Consequently, Cr (VI) has been targeted for elimination in accordance with recent changes in the policies of the Department of Defense (DoD), Air Force and various OEM's. The impact of the policy changes has created a need for Cr(VI)-free coatings that can exhibit functional performance properties at least the same as that of the ceramic coatings with Cr (VI)-based binders.

A two-layer protective coating system that is free of hexavalent chromium is disclosed in U.S. Pat. No. 6,444,332 to Bettridge. The Bettridge coating system comprises a chromized coating diffused into the surface of the metallic component and an overlay glass coating on the chromized coating, wherein the overlay glass coating preferably comprises a boron titanate silicate glass having a chromium oxide filler. This coating system provides oxidation and sulfidation resistance for the shank and root of the turbine blade. Although the glass overlay layer is free of hexavalent chromium, both layers of the disclosed protective system require high processing temperatures of 1050° C.-1100° C. (1920° F.-2010° F.) to diffuse the chromizing layer and 1030° C. (1890° F.) to form the overlay glass layer. Also, the fused glass is known to be not mechanically advantageous as a result of being prone to cracking and shattering easily under impact.

In view of the aforementioned deficiencies with today's coating systems, there is a continuing need for improved overlay coating systems that are based on hexavalent chromium-free binders, can be easily processed at lower temperatures (such as 300° C.-540° C.) and are capable of providing efficient hot corrosion protection for nickel-based superalloys against molten and/or fused sulfates attack.

SUMMARY OF THE INVENTION

The invention relates, in part, to slurries used to produce coating compositions with special properties. It has been found that utilizing a chromium-free aluminum phosphate-based coating system comprising a basecoat that is sealed with a top coat produces an overlay coating exhibiting superior hot corrosion and cycle heat resistance and which is capable of replacing traditional chromate-containing coating systems.

In a first aspect, an aqueous slurry composition for the production of a multilayer coating system for hot corrosion protection of a substrate is provided, comprising: a basecoat slurry, comprising: a first binder comprising an aluminum phosphate based aqueous solution having a molar ratio of Al:$PO_4$ higher than about 1:3, the first binder characterized by an absence of hexavalent chromium; and metal oxide particles incorporated into the first binder; a topcoat slurry, comprising: a second binder comprising an aluminum phosphate based aqueous solution having a molar ratio of Al:$PO_4$ higher than about 1:3, the second binder characterized by an absence of hexavalent chromium.

In a second aspect, a multilayer coating system for hot corrosion protection of a substrate is provided, comprising: a substrate; a basecoat on said substrate, said basecoat comprising: a first ceramic matrix formed from a slurry comprising a first hexavalent chromium-free, aluminum-phosphate based binder, wherein said first hexavalent chromium-free, aluminum-phosphate based binder has a molar ratio of Al:$PO_4$ higher than about 1:3; and metallic oxide particles embedded into the first ceramic matrix; a topcoat, comprising: a second ceramic matrix formed from a slurry comprising a second hexavalent chromium-free, aluminum-phosphate based binder, wherein said second hexavalent chromium-free, aluminum-phosphate based binder has a molar ratio of Al:$PO_4$ higher than about 1:3.

In a third aspect, a method of preparing a multilayer coating system for hot corrosion protection of a substrate is provided, comprising: preparing surface of a metal substrate; applying a basecoat slurry, said basecoat slurry comprising a first binder comprising an aluminum phosphate based aqueous solution having a molar ratio of Al:$PO_4$ higher than about 1:3, the first binder characterized by an absence of hexavalent chromium, and further wherein metal oxide particles are incorporated into the first binder; curing the basecoat slurry to form a basecoat, applying a topcoat slurry onto the basecoat, the topcoat slurry comprising a second binder comprising an aluminum phosphate based aqueous solution having a molar ratio of Al:$PO_4$ higher than about 1:3, the second binder characterized by an absence of hexavalent chromium; and curing the topcoat slurry to form a topcoat.

BRIEF DESCRIPTION OF THE DRAWINGS

The specification contains at least one photograph executed in color. Copies of this patent or patent publication with color photograph(s) will be provided by the Office upon request and payment of the necessary fee.

The objectives and advantages of the invention will be better understood from the following detailed description of the preferred embodiments thereof in connection with the accompanying figures wherein like numbers denote same features throughout and wherein:

FIG. 10 shows a visual appearance of the samples coated with the inventive coating system before testing (FIG. 10a) and after thermal cycling test with Mixture B sulfate deposit at 1310° F. (710° C.) (FIG. 10b after 100 cycles and 10c after 500 cycles), thus demonstrating that both the base coat and the top coat Cr (VI)-free ayers were preserved throughout the whole test.

DETAILED DESCRIPTION OF THE INVENTION

The relationship and functioning of the various elements of this invention are better understood by the following detailed description. However, the embodiments of this invention as described below are by way of example only. The detailed description contemplates the features, aspects and embodiments in various permutations and combinations, as being within the scope of the detailed description. The detailed description may therefore be specified as comprising, consisting or consisting essentially of, any of such combinations and permutations of these specific features, aspects, and embodiments, or a selected one or ones thereof.

The invention relates, in part, to slurry formulations used to produce overlay coatings and coating systems with special properties. Compositions of binder materials and specific combinations of the binder materials and the ceramic oxide powders have been found to affect the morphology and microstructure of the coating, resulting in a coated product that has superior functional properties in comparison to conventional coating systems. The coated products of the present invention are advantageous for several applications, and particularly advantageous in aerospace applications.

Aqueous slurry compositions of the present invention can be used to create a protective coating or coating systems onto various solid substrates, including, by way of example, ferrous alloys, nickel-based alloys, nickel-cobalt based alloys, and other metallic alloys (such as aluminum-based alloys, cobalt-based alloys, etc.). It should be understood that the aqueous slurry compositions of the present invention can also be used to create a protective coating or coating system onto nonmetallic thermally stable surfaces, such as ceramics. While the aqueous slurry compositions of the present invention are most advantageous for protecting Ni-based superalloys from detrimental effects of hot corrosion attack, any solid substrate may be suitable for the application of the coating of the present invention, provided that the solid substrate is preferably capable of withstanding coating processing temperatures of about 600-650° F.

In one aspect of the present invention, aqueous slurry compositions for the production of multilayer overlay coating system are provided. The aqueous slurry composition comprises a basecoat slurry. The basecoat slurry includes an aluminum phosphate-based binder having a molar ratio of Al:PO$_4$ of higher than about 1:3. The aluminum phosphate-based binder is incorporated with metal oxide particles. Preferably, the aluminum phosphate binder is incorporated with aluminum oxide particles. The aqueous slurry composition further includes a topcoat slurry, which also comprises an aqueous solution of an aluminum phosphate based binder having a molar ratio of Al:PO$_4$ of higher than about 1:3. The aluminum phosphate binder in the top coat slurry can be pigment free. Preferably, the aluminum phosphate binder in the top coat slurry is incorporated with pigment particles of ceramic metal oxides, such as chromium (III) oxide Cr$_2$O$_3$. The aluminum phosphate-based binder comprising aluminum oxide particles forms a layer adjacent to a superalloy substrate (further referred as a base coat), and the aluminum phosphate-based binder comprising chromium (III) oxide particles forms the second layer (further referred as a top coat). The aluminum phosphate-based binder in each of the basecoat slurry and topcoat slurry of the present invention does not contain Cr (VI) species, and therefore the aqueous slurry compositions and resultant multilayer overlay coating systems are environmentally safe materials.

It was discovered in the present invention that employing an aluminum phosphate-based binder composition with the metal oxide pigments incorporated therein, wherein the binder comprises Al and PO$_4$ species in Al:PO$_4$ molar ratio of higher than about 1:3, forms part of an overlay coating system that preserves adhesion to a metal substrate under thermal cycling and which is efficient in protecting superalloy substrates from corrosion attack by molten or fused alkali and alkaline earth sulfates at elevated temperatures typical of Type 2 hot corrosion attack. The molar ratio of Al:PO$_4$ in each of the topcoat and the basecoat can range from about 1:2.1 to 1:2.9, more preferably from about 1:2.2 to 1:2.8, and most preferably from about 1:2.4 to 1:2.7. As will be shown in the examples, the overlay coating systems derived from the aqueous slurries of the present invention demonstrated an outstanding adhesion to superalloy substrates, as well as interlayer adhesion such that the coating system can withstand a thermal cycling in corrosive environments at elevated temperatures typical of Type 2 hot corrosion attack, of about 1300 degrees F., without spallation, thus providing a stable and protective barrier from the corrodents.

Moreover, it was unexpectantly found that the hexavalent Cr(VI)-free coatings of the present invention provided significantly better functional performance than chromate-phosphate binder based commercial coating systems, such as SermaFlow N3000, the coating system disclosed in the U.S. Pat. No. 9,598,775, and equal or better performance that the coatings described in U.S. Pat. No. 7,314,674. Such findings by Applicants represent a significant departure from conventional systems. Prior to the emergence of the present invention, chromate-phosphate binder based coating systems, had been generally accepted as the benchmark in resistance to hot corrosion performance.

It was surprisingly found by Applicants, and as will be demonstrated in the Examples, when aluminum phosphate-based binders with a molar ratio of Al:PO$_4$ increased from 1:3 to 1:2.7 and 1:2.4, and were incorporated with micron-sized particles of aluminum oxide pigment particles to form basecoats of the present invention, the basecoats provided excellent adhesion to superalloy substrates. The basecoats of the present invention are sealed with a top coat layer that comprises an aluminum-phosphate based binder. The aluminum phosphate-based binder of the top coat layer is preferably filled, embedded or otherwise generally incorporated with micron-sized chromium (III) oxide Cr$_2$O$_3$ pigment particles. The multilayer coating system was capable of withstanding thermal cycling in air at temperatures as high as 1500° F. (816° C.) without exhibiting any signs of coating spallation.

Figure 1A:
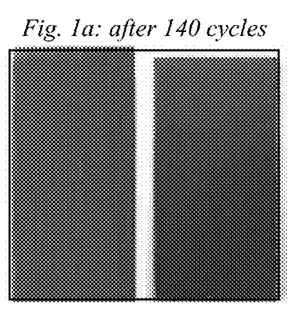
FIGS. 1(a), 1(b) and 1(c) show the coating system of the invention in thermal cycling test in air at 1500° F. (815° C.): after 140 cycles, after 260 cycles and after 400 cycles, correspondingly.
Figure 1B:
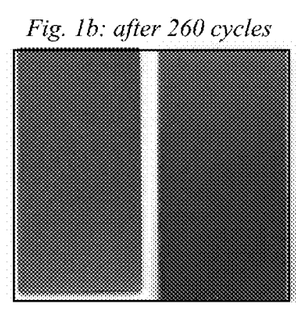
Figure 1C:
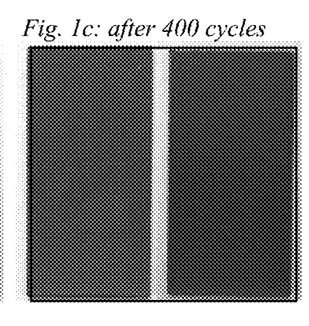
Figure 2A:
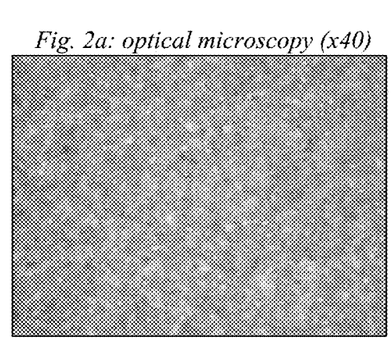
FIGS. 2(a) and 2(b) present surface morphology of the coating system of the invention in thermal cycling test: optical microscopy (at ×40 magnification, FIG. 2a) and SEM photos (at ×500 magnification, FIG. 2b) were taken after 200 cycles in air at 1500° F. (815° C.).
Figure 2B:
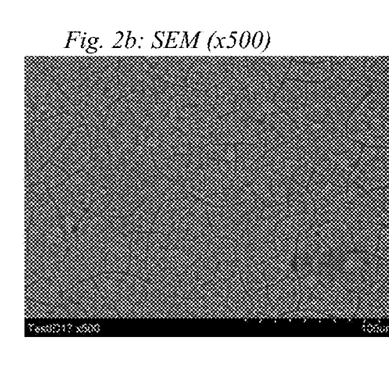

The multilayer coating system shown in FIG. 1, in one aspect of the present invention comprises a basecoat having an aluminum phosphate based binder with a molar ratio of Al:PO$_4$ equal to 1:2.4, and the binder is incorporated with alumina Al$_2$O$_3$ pigment particles. A top coat comprises an aluminum phosphate-based binder with a molar ratio of Al:PO$_4$ equal to 1:2.7, and the binder of the top coat is incorporated with Cr$_2$O$_3$ pigment particles. The resultant multilayer coating system of FIG. 1 has been applied to Inconel 718® substrates and the samples were exposed to thermal cycling in air (with a thermal cycle defined as having 50 minutes dwell in the hot zone, immediately followed by 10 minutes dwell at room temperature). There was no spallation of the coating observed, even after as many as 400 cycles (FIG. 1*c*) at the temperatures of the hot zone as high as 1500° F. (710° C.). Also, Applicants did not observe any increase in coating thickness. Additionally, the coating samples remained smooth and continuous (i.e., Ra<40 μinch before & after testing) with its morphology consistent and not deteriorated after the testing as shown in FIGS. 2*a* and 2*b*.

The results are indeed surprising as compared with the findings disclosed in the U.S. Pat. Nos. 7,314,674; and 7,754,342 to Hazel et. al. ("the Hazel Patents"), which generally has represented conventional wisdom. According to the teachings of the Hazel Patents, corrosion-resistant coating layers comprising solely alumina particles in a phosphate- or silica containing binder matrix, on a super alloy substrate fail and spall when subject to thermal cycling at elevated temperatures typical of Type 2 hot corrosion attack, such as 300 thermal cycles at 1400° F. (760° C.). The inventors in the Hazel Patents attributed the failure and spallation to a CTE mismatch between the coating and substrate.

Contrary to these teachings of the Hazel Patents, Applicants have discovered that the specific compositional modification of the aluminum phosphate-based binder of the present invention, in combination with aluminum oxide particles, may allow the coatings of the present invention to not fail in the thermal cycling test, which is performed at even higher temperatures and longer exposures. In other words, the compositional modification of the aluminum phosphate-based binder of the present invention eliminates any detrimental CTE mismatch effects observed in the Hazel Patents, thus eliminating any need in employing non-alumina metal alloy particles (such as MCrAlY alloy particles, where M is a nickel or nickel-cobalt alloy) with CTE greater than that of alumina. As will be described in more detail below in Comparative Example 1, this in turn is beneficial for a base coat slurry stability against settling, as well as for formation of a denser, less porous base coat that functions better as a corrosion protective barrier.

Not to be bound by any theory, an absence of any heat induced transformations of a coating binder matrix at elevated service temperatures higher than about 1300° F. may be a contributing factor in high tolerance toward thermal cycling stress demonstrated by the coating systems of the present invention.

Aluminum dihydrogen phosphate $Al(H_2PO_4)_3$ of stoichiometric composition with a molar ratio of $Al:PO_4$ of 1:3 is well known in the art as an efficient bonding agent for various ceramic materials (A. S. Wagh, Chemically Bonded Phosphate Ceramics, 2002) and is widely used in the refractory industry. When $Al(H_2PO_4)_3$ is heated, it loses water and a number of complex hydrates are formed; under further heat treatment, these complex hydrates decompose to form amorphous and crystalline aluminum phosphate phases with different stoichiometry; it is known in the art that the temperatures required to produce completely anhydrous aluminum phosphate phases are close to 500° C. (~930° F.), and subsequent transformations of anhydrous aluminum phosphate phases take place up to temperatures as high as 750° C. (~1380° F.) (e.g., see, M. Vipola et. al., J. Eur. Ceram. Soc., 22, 2002, pp. 1937-1946). This high temperature range of heat transformation completion makes stoichiometric aluminum dihydrogen phosphate $Al(H_2PO_4)_3$ with a molar ratio of $Al:PO_4=1:3$ not suitable to serve as a binder for the slurry-derived coatings of the present invention with customary cure temperatures in the range of 600° F. to 1000° F. Heat transformations continuing above this cure temperature range would lead to volume changes in the matrix and mechanical stresses in the coating under service conditions and thus loss of the coating integrity and its spallation from the underlying substrate.

As recognized and disclosed previously by Applicants in U.S. Pat. No. 9,394,448 to Belov et. al., which is incorporated herein by reference in its entirety, the heat transformation path of the aluminum phosphate is strongly dependent on the $Al:PO_4$ molar ratio. Increasing the molar ratio of $Al:PO_4$ from 1:3 of the stoichiometric aluminum dihydrogen phosphate results in a reduction of the temperatures of completion of these transformations, thereby achieving a complete cure at temperatures in the range of 600° F. to 1000° F. U.S. Pat. No. 9,394,448 discloses that these aluminum phosphate base binders with a molar ratio of $Al:PO_4$ greater than 1:3 have been employed in the top coating compositions, in conjunction with a chromate-free basecoat of aluminum metal particles filled, embedded or incorporated into a silicate matrix. However, the disclosed coating system in U.S. Pat. No. 9,394,448 is suitable and generally intended for corrosion protection of steel substrates and components at temperatures not exceeding about 1200° F. (i.e., at temperatures below the melting temperature of Aluminum metal of 1220° F. (660° C.)). Thus, the coating system of U.S. Pat. No. 9,394,448 is not suitable for Type 2 hot corrosion protection and cannot withstand service temperature conditions that the coatings of the present invention are specifically designed to withstand.

Applicants have recognized that a portion of their teachings in prior U.S. Pat. No. 9,394,448 to Belov et. al. is applicable in the present invention. Specifically, a compositional modification to stoichiometric aluminum dihydrogen phosphate involves increasing the molar ratio of $Al:PO_4$ from 1:3 of the stoichiometric aluminum dihydrogen phosphate to make the aluminum phosphate based binder suitable and beneficial for being employed in the multilayer coating systems of the present invention, for both the basecoat and the top coat. It should be understood, however, unlike U.S. Pat. No. 9,394,448, the coating systems of the present invention are suitable for an entirely different application with entirely different service conditions, namely for Type 2 hot corrosion protection of superalloy substrates.

Figure 3:
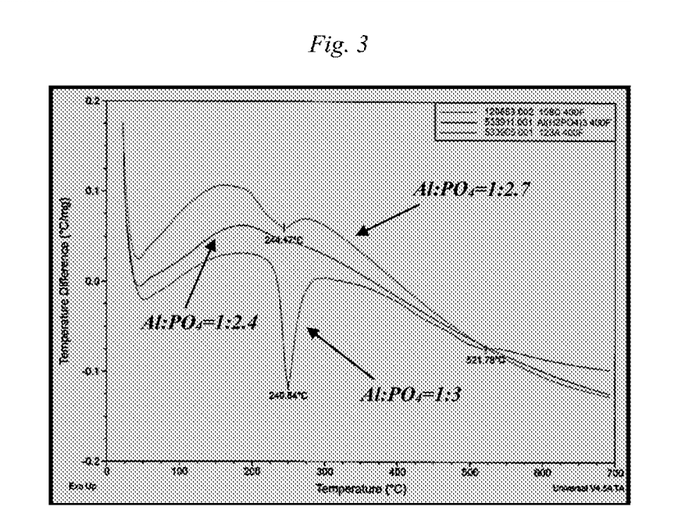
FIG. 3 provides results of Differential thermal analysis of Aluminum Phosphate binders with different aluminum to phosphate molar ratios to illustrate the phase transformations vs. Al:$PO_4$ ratio: Al:$PO_4$=1:3 of stoichiometric aluminum phosphate Al($H_2PO_4$)$_3$; Al:$PO_4$=1:2.7; Al:$PO_4$=1:2.4.

For a slurry-derived coating to be stable at a service temperature, any compositional and/or phase transformations of a binder must be completed during the coating cure process. Otherwise, internal stresses associated with the heat induced transitions can destroy a coating and can cause its delamination from a substrate under service conditions. In order to determine the effects of $Al:PO_4$ molar ratio on the curing process of aluminum phosphate-based binders of the present invention, the heat transformation path has been studied by Applicants by the thermal analysis method, as known in the art. The samples for this study were prepared by preheating small amounts of aluminum phosphates, each with different molar ratios of $Al:PO_4$ at 400° F. for 1 hour. The thermal analysis was performed (by employing a Universal V4.5A TA thermal Analyzer, and heating in air from room temperature to 700° C. (1292° F.) at a rate of 10° C./min). Results of Differential Scanning calorimetry (DSC) that determine peak temperatures of thermal effects are presented in FIG. 3 As seen from the data, for the stoichiometric aluminum dihydrogen phosphate of molar ratio $Al:PO_4=1:3$, a strong endothermic effect was observed at about 250° C. (482° F.), and another endothermic effect was observed at about 522° C. (972° F.). An increase in aluminum content in aluminum phosphate-based binder solutions from stoichiometric $Al:PO_4=1:3$ to $Al:PO_4=1:2.7$ and further to $Al:PO_4=1:2.4$ resulted in disappearance of the endothermic effects. These results indicate that the above increase in aluminum content led to a reduction of the temperatures of completion of the heat induced transformations as compared to the stoichiometric aluminum dihydrogen phosphate of molar ratio $Al:PO_4=1:3$. In other words, the compositions of the present invention are able to undergo a completion of heat induced transformations at temperatures well below in-service temperatures (i.e., typical temperatures of the Type 2 hot corrosion). This, in turn, means that the coatings of the present invention cured in the customary cure temperature regime of 600° F. to 1000° F. do not undergo any stress-induced transformations during service.

The aluminum content required to increase the molar ratio of Al:PO$_4$ can be supplied by any suitable aluminum containing raw material that is soluble in concentrated (~20-50 wt. %) acidic aqueous solution of aluminum dihydrogen phosphate, such as aluminum hydroxide, aluminum nitrate, etc.

Optionally, other additives known in the art can be incorporated into the aluminum phosphate based binder. By way of example, the aluminum phosphate based binder can comprise pH adjusting compounds (such as magnesium oxide, magnesium carbonate, etc.), small amounts (e.g., ~1-2 wt. %) of boron oxide B$_2$O$_3$, viscosity adjusting components. Alternatively, or in addition thereto, relatively small amounts of suitable organic solvents known in the art can also be added to improve properties, such as, for example, slurry sprayability, substrate wetting and film forming properties.

The slurry compositions of the present invention can be applied to a substrate by any number of conventional application techniques known in the art, such as by spraying, brushing, dipping, dip-spinning and the like. The applied layer is dried, and then cured. The binder solution polymerizes and solidifies under a drying and curing cycle to form a continuous matrix with acceptable mechanical strength, flexibility and chemical resistance. Aluminum oxide particles Al$_2$O$_3$ are embedded or generally incorporated into the matrix of the basecoat, and in the case the employed top coat is not pigment-free, then metal oxide particles, preferably chromium (III) oxide Cr$_2$O$_3$ are embedded or otherwise generally incorporated into the matrix of the top coat.

Thus, in another aspect of the present invention the multilayer coatings systems are disclosed that are capable of withstanding thermal cycling at elevated temperatures typical of Type 2 hot corrosion attack and provide protection to a metal substrate against such Type 2 hot corrosion attack. The base coat of the multilayer coating system of the present invention is generally applied to a thickness of between 0.5 to 3.0 mils, with a preferable thickness between 1.5 to 2.0 mils. Such a coating thickness can be built up in one layer (i.e., one application—drying—curing cycle), or preferably in two layers with two cure cycles. The minimum thickness of the basecoat layer is determined by a need to provide a continuous layer covering a substrate, and the maximum thickness of the basecoat layer is generally determined by a targeted or specified thickness of the entire multilayer overlay system. Preferably, a coating thickness in excess of functional requirements for a particular application is avoided.

The top coating slurries of the present invention are then applied to the base coat to form the resultant multilayer coating systems of the present invention. In a preferred embodiment, the top coating is applied to a thickness of between 0.1 to 0.5 mils, with a more preferable thickness between 0.1 to 0.3 mils.

Still further, the multilayer coating systems of the present invention may include a bond coat. The bond coat may be present to provide certain characteristics to the coated component, such as improved durability.

Typical cure temperatures of the coatings of the present invention are in the range of 600° F. to 1000° F. As evident to one of skill in the art, applicable curing operating regimes may include higher temperatures for a shorter time or lower temperatures for a longer time.

The multilayer coating systems of the present invention exhibit formation of dense, smooth and defect-free layers, as demonstrated in the Examples. The surface finish (smoothness) of the coatings Ra, as measured by Mitutoyo Surftest 301 (at a 5.1 mm traverse and 0.030" (0.76 mm) cutoff), is about 40 µinch (1 µm) or less.

As will be shown and discussed below in the Examples, the inventors have carried out extensive experiments to test the coating systems of the present invention for their ability to withstand a thermal cycling in the corrosive environment at elevated temperatures typical of Type 2 hot corrosion attack, without spallation, as well as their ability to provide a stable protective barrier for a superalloy substrate against sulfur containing corrodents attack. The selected testing temperature was 1310° F. (710° C.), which is representative of the temperatures encountered for Type 2 hot corrosion attack, with a thermal cycle defined as 50 minutes dwell time in the hot zone at the testing temperature, immediately followed by 10 minutes dwell time at room temperature.

Figure 4A:
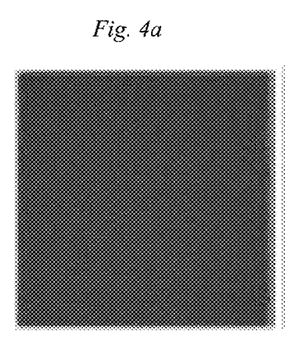
FIGS. 4(a) and 4(b) show the coating system of the invention behavior studied in thermal cycling test in the absence of deposit of corrosive sulfates and demonstrates its visual appearance before test (FIG. 4a), as well as visual appearance (FIG. 4b) and cross-sectional SEM (FIG. 4c) after 100 cycles in air at 1310° F. (710° C.).
Figure 4B:
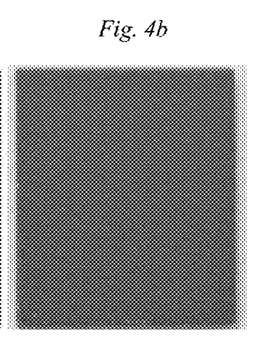
Figure 4C:
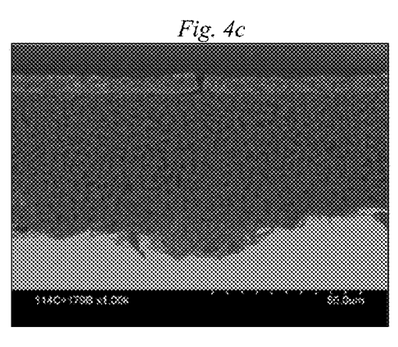

First, the Examples confirmed that the multilayer coating system of the present invention was completely stable under thermal cycling at the testing temperature of 1310° F. (710° C.) in the absence of the corrosive sulfate deposit and effectively protected a superalloy substrate from thermal oxidation. In this regard, as shown in FIG. 4, the change in coating visual appearance was negligible, and both the basecoat and the top coat of the system remained substantially structurally intact after 100 thermal cycles. Also, no change in the sample's weight was observed.

Next, two different mixtures of corrosive sulfates were prepared, as shown in Table 1. Mixture A corresponded to a eutectic composition of a ternary sulfate system with a melting point of 1275° F. (690° C.). As a result, Mixture A was present in a liquid phase at the testing temperature of 1310° F. (710° C.). In comparison to Mixture A, Mixture B contained a higher amount of calcium sulfate, with 50 weight % excess amount of CaSO$_4$ over Mixture A's eutectic composition (i.e. at the test temperature, Mixture B was present in both a liquid phase and a solid state). Thus, Mixture A was expected to be more aggressive in a sulfur-based corrosion attack than Mixture B. Nonetheless, Mixture B is believed to potentially represent closer to real in-service conditions than Mixture A. However, testing for sulfate hot corrosion attack with such an aggressive Mixture A provides accelerated test conditions. Accordingly, the total number of thermal cycles in tests that were run with Mixture A were less than tests that were run with Mixture B.

TABLE 1

Composition of Corrosion Materials

| | Content, weight percent, % | |
|---|---|---|
| Material | Mixture A | Mixture B |
| Na$_2$SO$_4$ | 53 | 26 |
| MgSO$_4$ | 37 | 18 |
| CaSO$_4$ | 10 | 55 |

Figure 5:
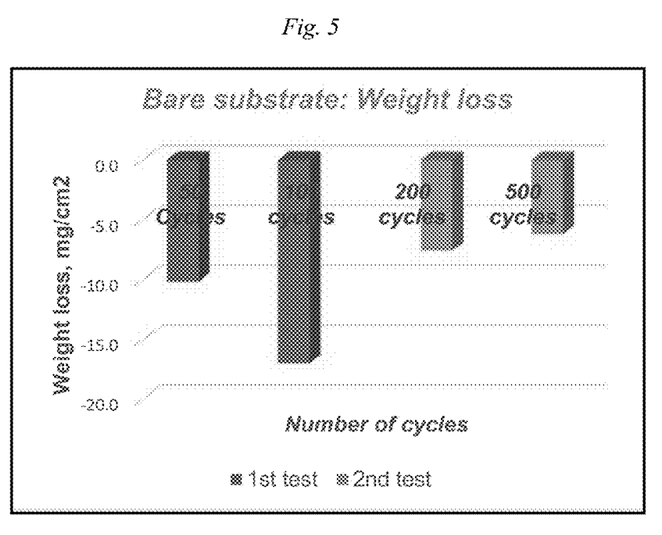
FIG. 5 provides baseline data on corrosive attack of sulfates Mixture A and Mixture B on bare super alloy substrates measured as a loss of metal in the thermal cycling test at 1310° F. (710° C.); the graph in FIG. 5 summarizes results of two tests performed with two different sulfate mixtures A and B.

In order to collect baseline data on the effects of corrosive attack on a superalloy, the testing was performed on bare Ni-based disc superalloy substrates (16 wt % Cr, such as RENE® 88). Mixture A was applied on sample surfaces of the Ni-based disc superalloy substrates in the amount of 2 mg per square centimeter of the coated sample surface area each 50 cycles, with a total of one hundred cycles run; and Mixture B was applied on sample surfaces of the Ni-based disc superalloy substrates also in the amount of 2 mg per square centimeter of the coated sample surface area, but reapplied each 100 cycles, with a total length of the test extended to five hundred cycles. It was observed that the bare substrates deteriorated dramatically in both tests as a result of sulfate attack. FIG. 5 presents weight loss of the bare substrate samples in the thermal cycling tests at 1310° F. (710° C.). As seen from the data, corrosion attack by both Mixture A and Mixture B led to a significant loss of the substrate material, and as expected, the weight loss was about two times higher after 100 cycles exposure to aggressive Mixture A (i.e., that was in a liquid state at the test temperature) than after 500 cycles with Mixture B. On the contrary, thermal cycling in the

TABLE 2

Bare substrate: thermal cycle test at 1310° F. (710° C.) without sulfate exposure

| Bare Substrate | Number of thermal cycles | Initial weight, gram | Weight after test, gram |
|---|---|---|---|
| Sample A | 50 | 6.0122 | 6.0129 |
| Sample B | 100 | 13.2402 | 13.2397 | absence of the Mixture A and Mixture B sulfates that was performed at the same test temperature of 1310° F. (710° C.) (i) did not produce any noticeable weight change of the bare substrate (Table 2), and (ii) revealed a very minor growth of thermal scale on the surface of the superalloy.

Figure 6A:
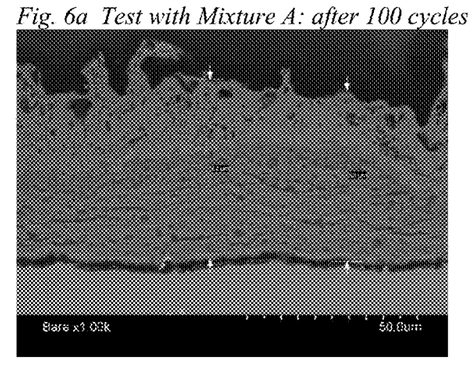
FIGS. 6(a) and 6(b) present cross-sectional SEM data on ×1000 magnification of bare super alloy substrates demonstrating corrosion products scale formation in a thermal cyclic test at 1310° F. (710° C.) performed with sulfate deposits of Mixture A after 100 cycles (FIG. 6a) and Mixture B after 500 cycles (FIG. 6b).
Figure 6B:
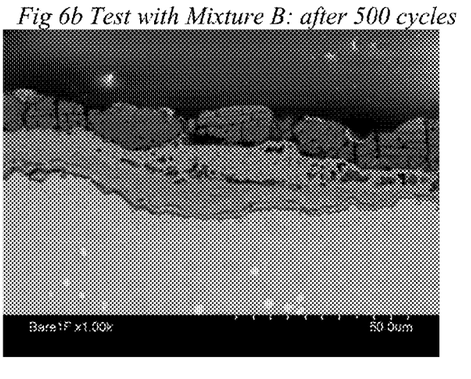

Thus, the weight loss of the substrate material was a result of the corrosive attack in the presence of sulfates and caused by consumption of the metal through growth of a scale of corrosion products on the surface, followed by spallation of this scale. As demonstrated by the SEM data of FIG. 6, the scale thickness is higher after 100 cycles in the case of Mixture A attack (FIG. 6a) as compared to its thickness after 500 cycles of exposure to Mixture B (FIG. 6b). The SEM data was consistent with the weight loss results shown in FIG. 5.

Figure 7A:
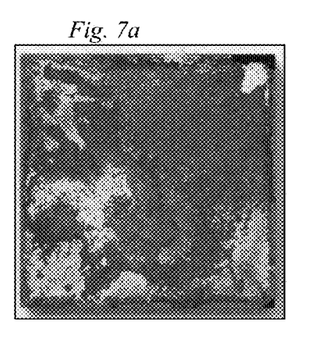
FIGS. 7(a) and 7(b) show that, from visual appearance, Cr (VI)-free coating system of the invention is superior on performance in comparison with a commercially available Cr (VI) containing coating system after 100 cycles at 1310° F. (710° C.) in the presence of aggressive Mixture A deposit of corrosive sulfates.
Figure 7B:
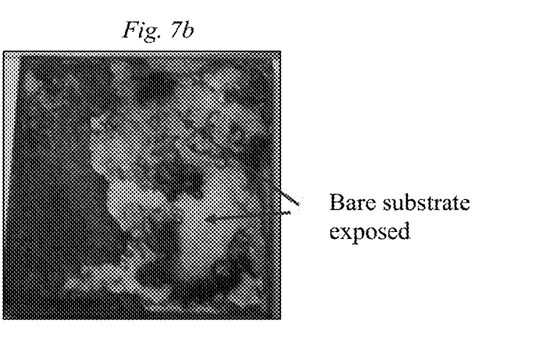

Next, the protective capabilities against sulfate attack of the chromate-free coating system of the present invention were compared with the Cr(VI)-containing systems known in the art, such as the system similar to the commercial SermaFlow® N3000. In this regard, the superalloy substrates coated with the coating system of the present invention were tested side-by-side with the substrates coated with a conventional coating system having a basecoat comprising chromate-phosphate binder filled with aluminum oxide $Al_2O_3$ particles, and a top coat comprising a chromate-phosphate binder filled with chromium (III) oxide $Cr_2O_3$ particles. Thus, the only difference between these two coating systems was the type of the binder matrix: Cr (VI)-free aluminum-phosphate based binder of the present invention vs. Cr (VI)-containing chromate-phosphate binder of the conventional coating systems. The test was performed with exposure to aggressive Mixture A sulfate deposit. The thermal cycling test was performed at 1310° F. (710° C.); the test results after one hundred cycles are presented in FIGS. 7a and 7b. As seen, the Cr (VI)-free coating system of the present invention performed noticeably better (FIG. 7a). Whereas the commercially available chromate-phosphate based coating system deteriorated and partially spalled to expose a bare substrate (FIG. 7b), the coating system of the present invention maintained its integrity. These results will be described in more details in Comparative Example 2. The side-by-side comparison is evidence that the change in binder matrix from a Cr (VI)-containing chromate-phosphate binder to a Cr (VI)-free aluminum-phosphate based binder produced a noticeable and significant improvement in performance.

While the preferred embodiments of the inventive slurries formulations and coating systems have been set forth above along with representative examples, the following additional examples are intended to provide a basis for better evaluating the properties and functions of the slurries and coating systems of the present invention. The examples are merely illustrative, and they are not to be construed as limiting the scope of the present invention.

It should be understood that all the slurries of the present invention were characterized by their pH, viscosity, specific gravity and solids content. These parameters, together with $D_{50}$ and $D_{90}$ (defined as diameters of the $50^{th}$ percentile of a pigment particle size distribution and the $90^{th}$ percentile of a pigment particle size distribution, respectively) were measured to test stability and aging of the slurries. It was found that the slurries demonstrated acceptable stability and a shelf life of six months and longer.

Each of the coatings in the Examples and Comparative Examples below were applied onto substrates of Ni-based superalloy containing 16 weight % percent Chromium. The substrates were initially surface treated by grit-blasting with 100 mesh grit.

Example 1

A base coat slurry was prepared by mixing of 120 grams of alumina ($Al_2O_3$) powder into 153 milliliters (187 grams) of aluminum phosphate based binder with a molar ratio of $Al:PO_4$ equal to 2.4. The pH of the basecoat slurry was measured to be about 1.4. The alumina pigment particle size was characterized as having a $D_{50}$ of about 2.5-3.0 microns and a $D_{90}$ of about 4.0-4.5 microns. The basecoat slurry was then sprayed onto the substrate, dried at 175° F. for 15 minutes and then cured at 650° F. for 30 minutes to form a cured layer of the basecoat. A top coat slurry was prepared by mixing of 24 grams of chromium (III) oxide $Cr_2O_3$ green pigment with 200 grams of aluminum phosphate based binder with a molar ratio of $Al:PO_4$ equal to 1:2.4. The binder also contained 3.0 grams of $B_2O_3$. The pH of the top coat slurry was measured to be about 1.5. The pigment particle size in the topcoat slurry was characterized as having a $D_{50}$ of about 1.3-1.7 microns, and a $D_{90}$ of about 2.2-2.7 microns. The top coat slurry was sprayed onto the cured layer of the basecoat, dried at 175° F. for 15 minutes, and then cured at 650° F. for 30 minutes followed by curing at 1000° F. for 60 minutes to form a cured layer of the topcoat. The total thickness of the basecoat and top coat coating system was determined to be in the range from 2.1 to 2.3 mils.

The coated samples were subject to the thermal cycling test with exposure to sulfate Mixture A applied onto the coated sample surfaces in the amount of 2 mg per square centimeter of the coated sample surface area each 50 cycles.

TABLE 3

Thermal cycle test at 1310° F. (710° C.) with sulfate Mixture A exposure

| Coatings | # cycles | Initial W, g | Final W, g | ΔW, g | ΔW, mg/cm2 |
|---|---|---|---|---|---|
| Sample A | 50 | 6.8486 | 6.8504 | 0.0018 | 0.43 |
| Sample B | 50 | 4.7575 | 4.7582 | 0.0007 | 0.23 |
| Sample C | 100 | 5.0961 | 5.095 | −0.0011 | −0.35 |

TABLE 3-continued

Thermal cycle test at 1310° F. (710° C.) with sulfate Mixture A exposure

| Coatings | # cycles | Initial W, g | Final W, g | ΔW, g | ΔW, mg/cm2 |
|---|---|---|---|---|---|
| Sample D | 100 | 6.2305 | 6.2298 | −0.0007 | −0.18 |
| Bare substrate | 50 | 5.2185 | 5.1857 | −0.0328 | −10.18 |
| Bare substrate | 100 | 7.113 | 7.0579 | −0.0551 | −15.52 |
| Bare substrate | 100 | 5.616 | 5.5547 | −0.0613 | −18.46 |

Four samples A through D were used. Samples A and B were tested for 50 cycles, respectively, and Samples C and D were tested for 100 cycles, respectively. The weight change was measured after each 50 cycles, with the coating surface cleaned from the sulfate residue with water prior to taking weight measurements. The data are presented in Table 3, as milligrams of a weight change ΔW per square centimeter of the sample surface area.

Figure 8:
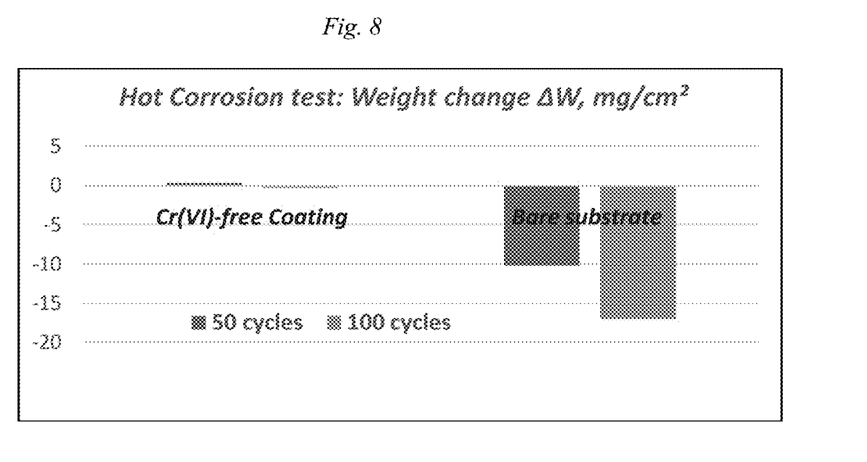
FIG. 8 demonstrates that the coating system of the invention efficiently prevents weight loss in the thermal cycling test in the presence of Mixture A of corrosive sulfates at 1310° F. (710° C.), as compared to the bare substrate.

As seen from the data, the weight change of the coated samples A-D was insignificant, especially as compared to the very high weight loss of the bare substrates. The comparison is also shown in the data in the graphical form in FIG. 8.

Example 2

Figure 9A:
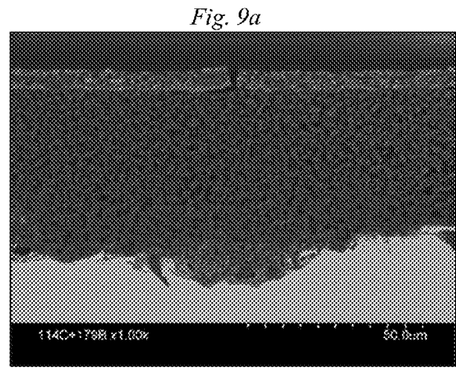
FIGS. 9(a) and 9(b) present cross-sectional SEM data on ×1000 magnification for the coating system of the invention after 100 cycles at 1310° F. (710° C.) performed without sulfate deposit and with aggressive sulfate Mixture A, as described in Example 2.
Figure 9B:
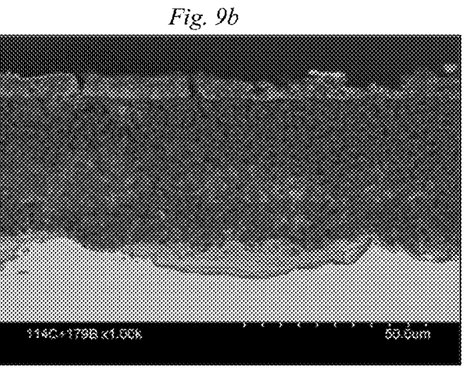

The samples of the coating system of Example 1 were subject to a thermal cycle test at 1310° F. (710° C.) for 100 cycles. One group of the samples was tested without application of the corrosive sulfate mixture, and another group was tested with application of the aggressive sulfate Mixture A. After testing, the samples were cross-sectioned and examined by SEM analysis. As seen from the SEM results (FIGS. 9a and 9b), both groups of the samples preserved the coating layers—even the top coat was not lost as a result of the sulfate attack. Thus, despite exposing the coated samples to aggressive testing conditions designed to be more harsh than real in-service conditions, only minor changes of the substrate in some areas on the boundary with the coating layer were detected. The SEM results confirmed that the Cr (VI)-free multilayer coating system of the present invention serves as an efficient barrier for corrosive attack by melted sulfates.

Example 3

Samples E and F were prepared and coated with the multilayer coating system of the present invention as described in the Example 1, to a total thickness of the basecoat and top coat coating system in a range from 1.6 to 1.8 mils. The coated samples were subject to the thermal cycling test with less aggressive sulfate Mixture B. Mixture B was applied on sample surfaces in the amount of 2 mg per square centimeter of the coated sample surface area each 100 cycles. The total test length was extended to 500 cycles. The samples were cleaned with water and weighed after 100 cycles and at the end of test (i.e. after 500 cycles). For the baseline data, bare substrates were also included in this test, with the weight change data collected after 200 and 500 cycles.

Figure 10A:
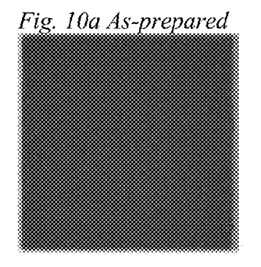
Figure 10B:
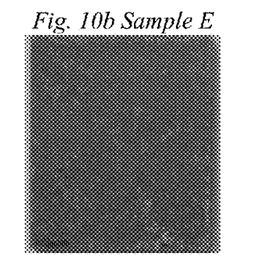
Figure 10C:
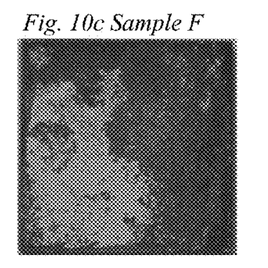

As observed by the visual appearance (FIGS. 10a, 10b and 10c), the inventive coating system stayed on the substrate throughout the whole test, and even the top coat layer was preserved after 500 cycles of testing (see Sample F in FIG. 10c).

As seen from the weight change data presented in Table 4, the coating systems of the present invention was also efficient in protecting the substrate from corrosive attack by the mixture of melted and solid sulfates: the coated samples demonstrated a minor increase in weight, most probably caused by a thermal oxidation process, whereas the bare substrates underwent a significant weight loss caused by sulfate corrosion. As was discussed earlier, the substrate weight loss in this longer test with less aggressive sulfate Mixture B was lower than with more aggressive Mixture A (see FIG. 5), but still demonstrated a detrimental loss of base metal.

TABLE 4

Thermal cycle test at 1310° F. (710° C.) with sulfate Mixture B exposure

| Coatings | # cycles | Initial W, g | Final W, g | ΔW, g | ΔW, mg/cm2 |
|---|---|---|---|---|---|
| Sample E | 100 | 7.4466 | 7.4490 | 0.0024 | 0.537 |
| Sample F | 500 | 8.1059 | 8.1100 | 0.0041 | 0.835 |
| Bare substrate | 200 | 7.0026 | 6.9697 | 0.0329 | −7.616 |
| Bare substrate | 500 | 6.0786 | 6.0559 | 0.0227 | −6.219 |

Figure 11A:
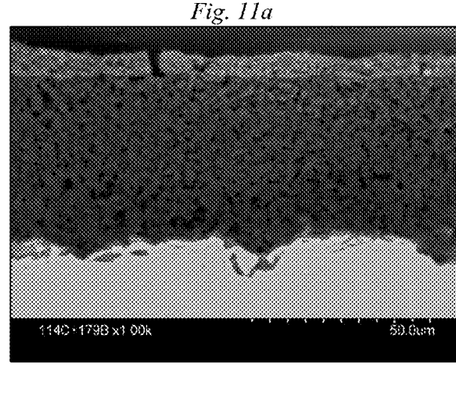
FIGS. 11(a) and 11(b) present cross-sectional SEM data on ×1000 magnification for the coating system of the invention after 100 cycles and after 500 cycles, correspondingly, at 1310° F. (710° C.) performed with less aggressive sulfate Mixture B deposit, as described in Example 3.
Figure 11B:
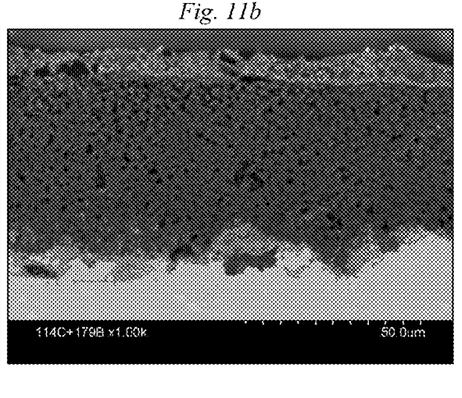

After testing, Sample E and Sample F were cross-sectioned and examined by SEM/EDS analysis. As seen from the SEM results (FIGS. 11a and 11b), both samples preserved the coating layers—the basecoat was intact, and even the top coat was not lost after 500 cycles of the sulfate corrosive attack. EDS analysis data confirmed that the observed small gain in the samples weight after the test was mostly a result of the substrate minor oxidation in some local areas on the boundary with the coating layer, with no noticeable sulfidation attack. Thus, in these less aggressive, but five times more prolonged testing conditions, Applicants validated that the Cr (VI)-free coating system of the present invention serves as an efficient barrier for corrosive attack by a mixture of melted and solid sulfates.

Comparative Example 1

To compare functional performance in hot corrosion protection of the Cr (VI)-free coating system of the present invention with another commercially available Cr (VI)-containing coating system, coated samples G and H were prepared in accordance with the teachings of U.S. Pat. No. 7,314,674 to Hazel et. al. Sample G and Sample H were prepared as follows. The basecoat slurry of the Cr (VI)-containing coating system comprised a chromate-phosphate based binder filled with metal alloy powder with the representative formula MCrAlY (where M is Ni or Co). The basecoat slurry was sprayed on the substrates, dried at 175° F. for 15 minutes and then cured at 650° F. for 30 minutes to form a cured basecoat layer. Then, the cured basecoat layer was further coated with a top coat slurry comprising a chromate-phosphate based binder filled with particles of metal oxide pigments. SermaSeal™ 570A slurry commercially available from Praxair Surface Technologies, Inc. (Indianapolis, Ind.) was employed for a top coat slurry. The top coat slurry was sprayed on the cured layer of the basecoat, dried at 175° F. for 15 minutes and cured at 650° F. for 30 minutes. The total thickness of the applied Cr (VI)-containing coating system on Samples G and H was in the range of 1.6-1.8 mils, i.e. the same as for Cr (VI)-free coating system Samples E and F in Example 3. The coated samples G and H were subject to the thermal cycling test with exposure to less aggressive sulfate Mixture B, in accordance to the test protocol as in Example 3.

Figure 12A:
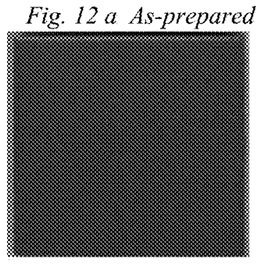
FIGS. 12(a), 12(b) and 12(c) show a visual appearance of the samples coated with the Cr(VI)-containing system prepared in accordance with U.S. Pat. No. 7,314,674; the samples are shown before testing (FIG. 12a) and after a thermal cycling test with Mixture B sulfate deposit at 1310° F. (710° C.) (FIG. 12b after 100 cycles and 12c after 500 cycles), thus demonstrating an inferior performance of this commercially available coating system, in comparison to the Cr(VI)-free coating system of the present invention, as described in Comparative Example 1.
Figure 12B:
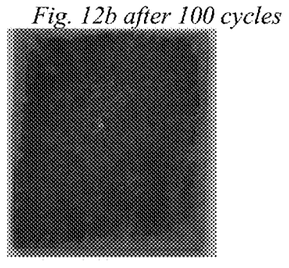
Figure 12C:
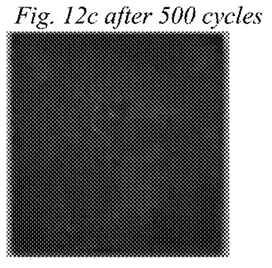

According to the results, in contrast to the Cr (VI)-free coating system of the present invention that preserved its top coat through 500 cycles of testing, the Cr (VI)-containing coating system samples demonstrated that the top coat was mostly lost only after 100 cycles and completely absent after 500 cycles (see FIG. 12 b and FIG. 12 c, respectively). The weight gain of 1.478 mg per square centimeter of the coated sample surface area was measured for Sample G that was exposed to 100 cycles and of 3.417 mg per square centimeter of the coated sample surface area for Sample H after 500 cycles, i.e. 3-4 times higher as compared with the corresponding weight gain for the Cr (VI)-free coating system of the present invention. Also, EDS analysis indicated that a sulfidation attack was more significant in the case of the Cr (VI)-containing coating: in most analyzed spots on the substrate—coating boundary, up to 6.5 atomic percent of sulfur had been detected.

Figure 13:
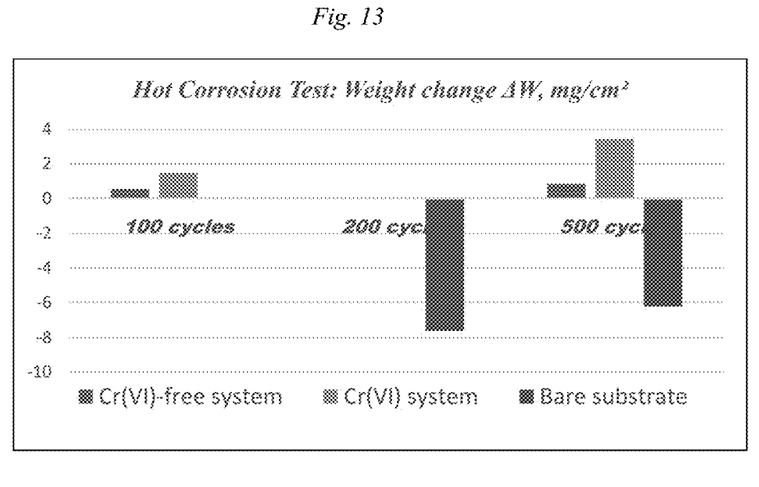
FIG. 13 compares the weight change in thermal cycling test at 1310° F. (710° C.) with Mixture B sulfate deposit for the bare substrate, as compared to the commercially available Cr (VI)-containing coating of Comparative Example 1, as well as to the Cr(VI)-free coating of the present invention.

The data obtained in this Comparative Example 1 in comparison with the data of the Example 3 are presented in FIG. 13. Overall, although both systems preserved the substrate from corrosive sulfate attack, the coating system of the present invention performed significantly better. Thus, the inventive coating system provides not only a benefit of being environmentally compliant and free of hexavalent chromium presence, but also demonstrates better functional performance than a commercial Cr (VI)-containing coating system generally accepted as the benchmark in resistance to hot corrosion performance prior to the emergence of the present invention.

Comparative Example 2

Figure 14:
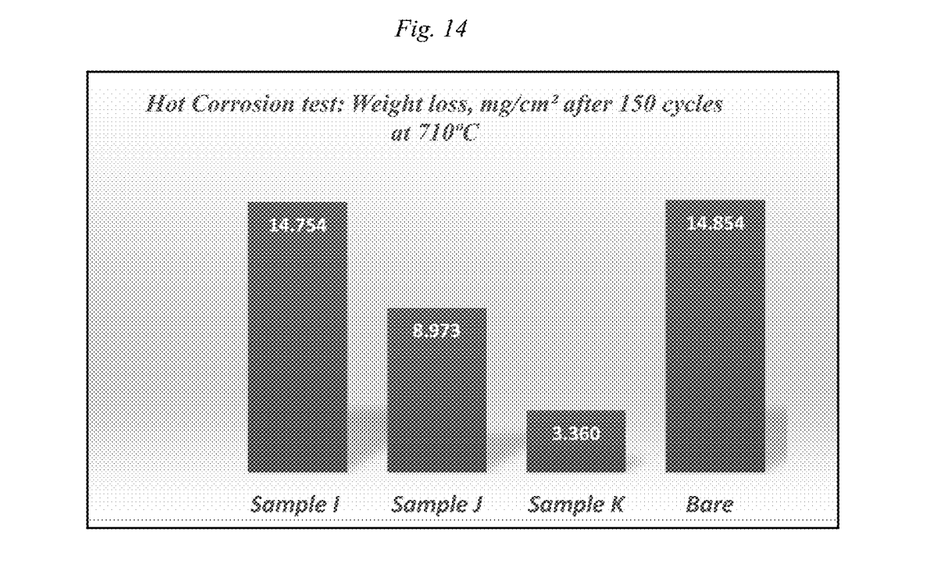
FIG. 14 compares the weight loss after 150 cycles of thermal cycling testing at 1310° F. (710° C.) with exposure to Mixture A sulfate deposit for a bare substrate vs. 2 Cr (VI)-containing coating systems and a Cr(VI)-free coating of the present invention, as described in Comparative Example 2.

In this test, two coating systems that are commercially available were prepared to evaluate their ability to impart protective properties against attack by the aggressive molten sulfate Mixture A. The thermal cycling test was performed at 1310° F. (710° C.) according to the protocol described in Example 1, but for a longer duration of one hundred fifty cycles. For this test, the coated samples I through K were prepared as follows. Sample I was coated with a commercial Cr (VI)-containing system, known as SermaFlow® N3000 and available from Praxair Surface Technologies, Inc. (Indianapolis, Ind.), having a basecoat comprising chromate-phosphate binder filled with aluminum oxide $Al_2O_3$ particles, and a top coat comprising a chromate-phosphate binder filled with chromium (III) oxide $Cr_2O_3$ particles. Sample J of another Cr (VI)-containing coating system was prepared as described in the Comparative Example 1 (i.e. utilizing a basecoat comprising a chromate-phosphate based binder filled with metal alloy powder with the representative formula MCrAlY, and a top coat of SermaSeal™ 570A). Sample K was coated with the coating system of the present invention, as described in Example 1. A bare substrate sample was also included in this test to provide a baseline. As seen from FIG. 14 that presents results of this side-by-side comparisons, the Cr (VI)-free coating system of the present invention with aluminum-phosphate based binder matrix significantly outperformed commercially available systems and produced drastic improvement in protection of the superalloy substrate against hot corrosion by molten sulfate attack.

Comparative Example 3

In this test, a Cr (VI)-free coating system with a Lithium-doped Potassium silicate binder based basecoat as described in U.S. Pat. No. 9,394,448 to Belov et. al was prepared to evaluate its performance against attack by the aggressive molten sulfate Mixture A. A base coat slurry was prepared by mixing of 230 grams of alumina ($Al_2O_3$) powder into 307 grams Li-doped K silicate-based binder. The alumina pigment particle size was the same as in Example 1 (i.e., $D_{50}$ of about 2.5-3.0 microns and a $D_{90}$ of about 4.0-4.5 microns). The pH of the basecoat slurry was measured to be about 10.9. The basecoat slurry was then sprayed onto the substrate, dried at 175° F. for 15 minutes and then cured at 650° F. for 30 minutes to form a cured layer of the basecoat. A top coat slurry as employed in Example 1 was used (i.e., mixing of chromium (III) oxide $Cr_2O_3$ into aluminum phosphate-based binder with a molar ratio of Al:$PO_4$ equal to 1:2.4). The top coat slurry was sprayed onto the cured layer of the basecoat, dried at 175° F. for 15 minutes, and then cured at 650° F. for 30 minutes followed by curing at 1000° F. for 60 minutes to form a cured layer of the topcoat. The total thickness of the basecoat and top coat coating system was determined to be in the range from 2.5 to 2.7 mils.

Figure 15:
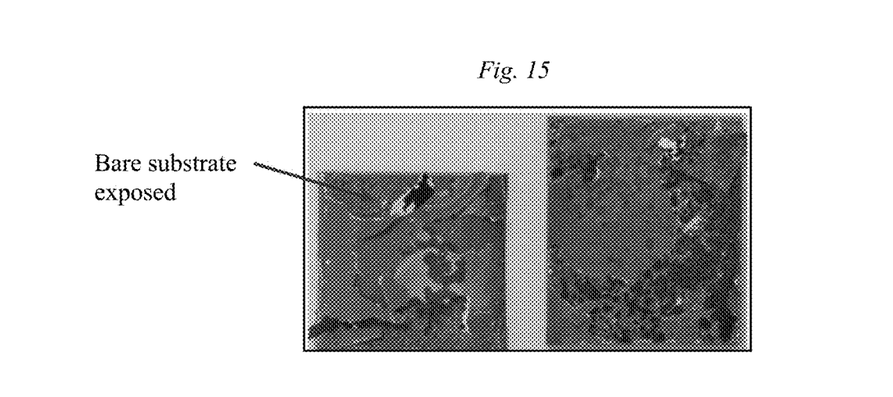
FIG. 15 demonstrates performance failure of a Cr (VI)-free coating system with a Li-doped Potassium silicate-based basecoat, as described in Comparative Example 3, after subject to 50 cycles of thermal cycling testing at 1310° F. (710° C.) in the presence of aggressive Mixture A deposit of corrosive sulfates.

Two coated samples were then subjected to the thermal cycling test with exposure to sulfate Mixture A. The same testing protocol for the thermal cycling as in Example 1 was employed. The results are presented in FIG. 15, which clearly show a large portion of the coating was destroyed and spalled after only 50 cycles. These results demonstrated that the Cr (VI)-free coating system with Lithium-doped silicate-based basecoat binder as described in U.S. Pat. No. 9,394,448 to Belov et. al was not suitable for service under sulfate corrosion attack.

The invention claimed is:

1. An aqueous slurry composition for the production of a multilayer coating system for hot corrosion protection of a substrate comprising:
    a basecoat slurry, comprising:
    a first binder comprising an aluminum phosphate based aqueous solution having a molar ratio of Al:PO4 higher than about 1:3, the first binder characterized by an absence of hexavalent chromium; and
    metal oxide particles incorporated into the first binder;
    a topcoat slurry, comprising:
        a second binder comprising an aluminum phosphate based aqueous solution having a molar ratio of Al:PO4 higher than about 1:3, the second binder characterized by an absence of hexavalent chromium.

2. The aqueous slurry composition of claim 1, wherein the metal oxide particles are selected from the group consisting of aluminum oxide, titanium oxide, and chromium oxides.

3. The aqueous slurry composition of claim 1, wherein the metal oxide particles of the basecoat slurry, comprise aluminum oxide Al2O3 particles incorporated into said first binder, and the topcoat slurry comprises trivalent chromium oxide Cr2O3 particles incorporated into said second binder.

4. The aqueous slurry composition of claim 1, wherein the molar ratio of Al:PO4 in the second binder of the topcoat slurry ranges from about 1:2.1 to about 1:2.8, and the molar ratio of Al:PO4 in the first binder of the basecoat slurry ranges from about 1:2.1 to about 1:2.8.

5. The aqueous slurry composition of claim 1, wherein the molar ratio of Al:PO4 in the second binder of the topcoat slurry ranges from about 1:2.4 to about 1:2.7 and the molar ratio of Al:PO4 in the first binder of the basecoat slurry ranges from about 1:2.4 to about 1:2.7.

6. The aqueous slurry composition of claim 1, wherein the basecoat slurry comprises aluminum oxide $Al_2O_3$ particles, with a particle size distribution characterized in that a 50th percentile of the particle size distribution has a diameter of between about 2.5 to 3.0 microns and a 90th percentile of the particle size distribution has a diameter of between about 4.0 to about 4.5 microns.

7. The aqueous slurry composition of claim 1, wherein the topcoat slurry further comprises trivalent chromium oxide (Cr2O3) particles with a particle size distribution characterized in that a 50th percentile of the particle size distribution has a diameter of between about 1.0 and 2.0 microns and the 90th percentile of the particle size distribution has a diameter of less than or equal to about 3.0 microns.

8. A multilayer coating system for hot corrosion protection of a substrate, comprising:
   a substrate;
   a basecoat on said substrate, said basecoat comprising:
      a first ceramic matrix formed from a slurry comprising a first hexavalent chromium-free, aluminum-phosphate based binder, wherein said first hexavalent chromium-free, aluminum-phosphate based binder has a molar ratio of Al:PO4 higher than about 1:3; and
      metallic oxide particles embedded into the first ceramic matrix;
   a topcoat, comprising:
      a second ceramic matrix formed from a slurry comprising a second hexavalent chromium-free, aluminum-phosphate based binder, wherein said second hexavalent chromium-free, aluminum-phosphate based binder has a molar ratio of Al:PO4 higher than about 1:3.

9. The multilayer coating system of claim 8, wherein the substrate is a nickel-based superalloy substrate.

10. The multilayer coating system of claim 8, wherein the metal oxide particles are embedded or otherwise generally incorporated in the first ceramic matrix of the basecoat, said metal oxide particles comprising aluminum oxide $Al_2O_3$, and further wherein trivalent chromium oxide Cr2O3 particles are embedded or otherwise generally incorporated in the second ceramic matrix of the topcoat.

11. The multilayer coating system of claim 8, wherein the molar ratio of Al:PO4 in the first hexavalent chromium-free, aluminum-phosphate based binder ranges from about 1:2.1 to about 1:2.9 and the molar ratio of Al:PO4 in the second hexavalent chromium-free, aluminum-phosphate based binder ranges from about 1:2.1 to about 1:2.9.

12. The multilayer coating system of claim 8, wherein the molar ratio of Al:PO4 in the first hexavalent chromium-free, aluminum-phosphate based binder ranges from about 1:2.4 to about 1:2.7 and the molar ratio of Al:PO4 in the second hexavalent chromium-free, aluminum-phosphate based binder ranges from about 1:2.4 to about 1:2.7.

13. The multilayer coating system of claim 8, wherein the metal oxide particles embedded or otherwise generally incorporated in the first ceramic matrix comprise aluminum oxide in a particle size distribution characterized in that a 50th percentile of the particle size distribution has a diameter of between about 2.5 to 3.0 microns and a 90th percentile of the particle size distribution has a diameter of between about 4.0 to about 4.5 microns.

14. The multilayer system of claim 8, wherein the topcoat further comprises trivalent chromium oxide Cr2O3 with a particle size distribution characterized in that a 50th percentile of the particle size distribution has a diameter of between about 1.0 and 2.0 microns and the 90th percentile of the particle size distribution has a diameter of less than or equal to about 3.0 microns.

15. A method of preparing a multilayer coating system for hot corrosion protection of a substrate, comprising:
   preparing surface of a metal substrate;
   applying a basecoat slurry, said basecoat slurry comprising a first binder comprising an aluminum phosphate based aqueous solution having a molar ratio of Al:PO4 higher than about 1:3, the first binder characterized by an absence of hexavalent chromium, and further wherein metal oxide particles are incorporated into the first binder;
   curing the basecoat slurry to form a basecoat,
   applying a topcoat slurry onto the basecoat, the topcoat slurry comprising a second binder comprising an aluminum phosphate based aqueous solution having a molar ratio of Al:PO4 higher than about 1:3, the second binder characterized by an absence of hexavalent chromium; and
   curing the topcoat slurry to form a topcoat.

16. The method of claim 15, further comprising:
   incorporating aluminum oxide $Al_2O_3$ particles into the basecoat slurry; and
   incorporating, particles of trivalent chromium oxide Cr2O3 into the topcoat slurry.

17. The method of claim 15 further comprising applying the basecoat slurry to form the basecoat at a thickness of between 0.5 to 3.0 mils.

18. The method of claim 15, further comprising applying the topcoat slurry to form the topcoat at a thickness of between 0.1 to 0.5 mils.

19. The method of claim 15, wherein the step of curing the basecoat slurry and the step of curing the topcoat slurry occurs in range of 600° F. to 1000° F.

* * * * *